Aug. 18, 1970 R. V. BURNS ET AL 3,524,929
TELEPHONE CONFERENCE CIRCUIT
Filed June 29, 1967
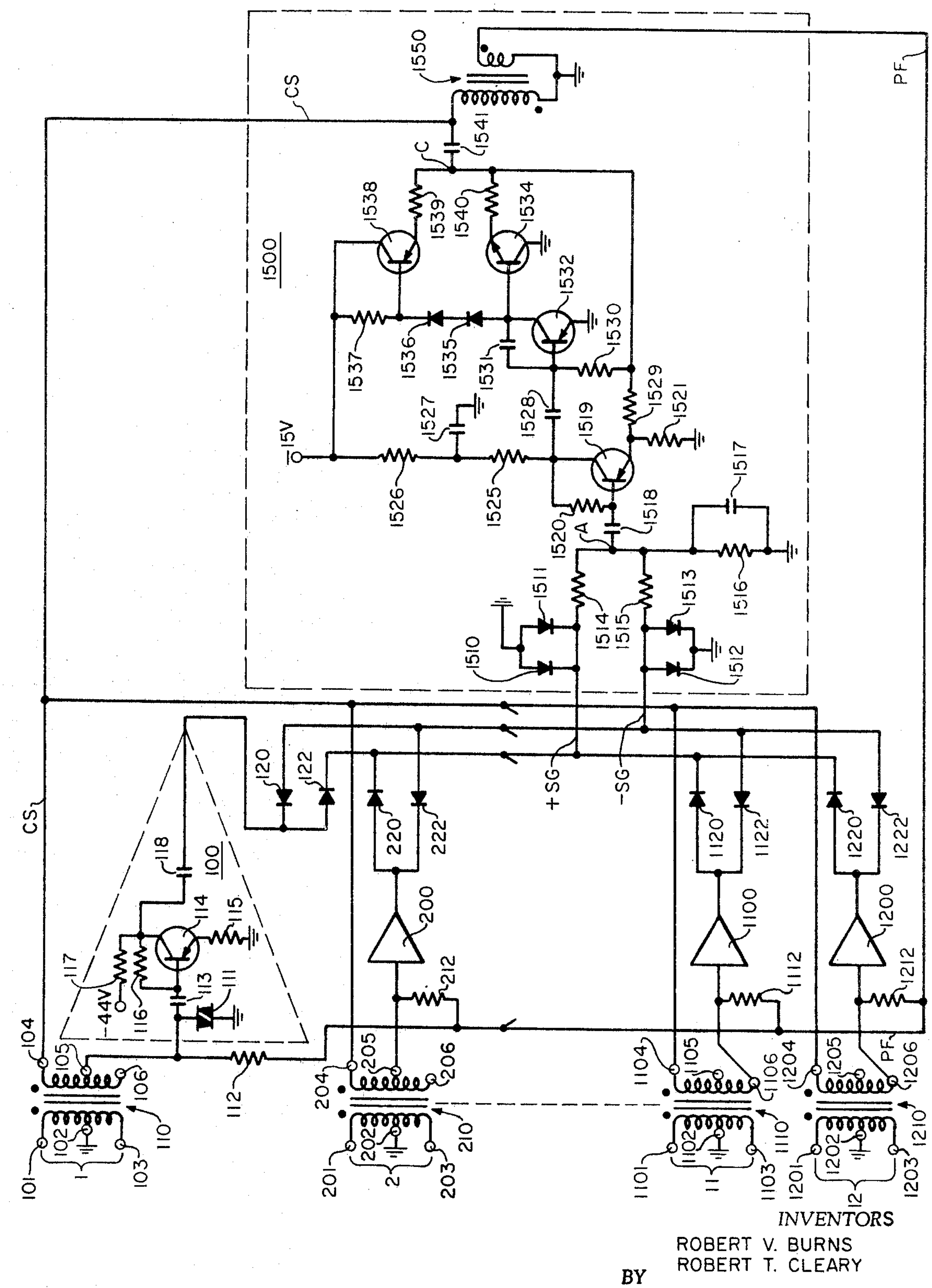
INVENTORS
ROBERT V. BURNS
ROBERT T. CLEARY
BY
Leonard J. Kalinowski
AGENT United States Patent Office 3,524,929
Patented Aug. 18, 1970

3,524,929

TELEPHONE CONFERENCE CIRCUIT

Robert V. Burns, Tinley Park, and Robert T. Cleary, Lockport, Ill., assignors to Automatic Electric Laboratories, Inc., a corporation of Delaware Filed June 29, 1967, Ser. No. 649,956
Int. Cl. H04m 3/56
U.S. Cl. 179—1 5 Claims

ABSTRACT OF THE DISCLOSURE

A circuit for interconnecting a plurality of telephone lines includes an amplifier common to the lines for amplifying signals incoming from a transmitting line and for returning the amplified signals to the other lines. A plurality of diode gate circuits, each individual to one of the lines and connected between the corresponding line and the common amplifier input, separate the positive from the negative portions of the signals on each line and then pass only the signals incoming from the lines to the common amplifier input where the signals are reassembled. A feedback technique is used to permit discrimination between a signal incoming from or outgoing to one of the lines by causing the signal at the input of the gate connected to the transmitting line to be of greater amplitude than, but of the same phase as, the signal at the input of the gates connected to the receiving lines.

BACKGROUND OF THE INVENTION

This invention relates to telephone systems and more particularly to improvements in circuits, such as conference circuits, for interconnecting a plurality of lines in such systems.

Such conference circuits provide the means whereby three or more persons may hold a conference over a corresponding number of telephones. This type of service has particularly wide application in P.B.X. and P.A.X. telephone systems where it is desirable to have a group of persons in conference with each other either for a toll or for a local call.

Whenever more than two telephone lines are interconnected by a conference circuit, two-way transmission between the lines should be accomplished with negligible transmission loss so that the transmission level is equivalent to the standard for a regular two-party connection. Hybrid repeaters employed in conference circuits permit many lines to be connected into a conference without inserting excessive losses. However, the major disadvantage of this type of circuit is that the line impedance must match the hybrid impedance, and although a small amount of hybrid unbalance can be tolerated without causing the repeater to sing, idle-line terminations must be provided to insure stable operation and to minimize echo.

The stability of most prior art conference circuits is maintained by connecting a termination resistor to an input port whenever a line is removed from that port. It is more desirable, however, that it be possible to add or to remove lines or trunks during the course of a conference call without the need for such connections.

A circuit for interconnecting a plurality of lines which does not require the use of a hybrid-circuit and which maintains transmission levels constant as lines are connected to or disconnected from the circuit is shown in U.S. Pat. 2,912,503 of the same assignee to which this application is assigned. In this circuit the impressions of a signal across an amplifier are made dependent on a determination of whether signal power flows in the direction towards or away from the junction between the line, and this determination involves first separating the positive from the negative portions of each line signal and then reassembling those two portions of the signal. The amplified signal is returned to the lines that are interconnected by the circuit.

More specifically, in the arrangement disclosed in U.S. Pat. 2,912,503, the determination of the direction of signal power flow further includes the use of a phase-sensitive network for each line and a transformer and a diode-resistor network. The network detects the direction of signal power flow between a corresponding line and the junction and each network is effective to permit signals transmitted over the corresponding line to be impressed on the input to the amplifier only if signal power flows from the corresponding line into the junction but not if the power is flowing in the opposite direction.

SUMMARY OF THE INVENTION

This invention provides an improved interconnecting circuit for use in a telephone system to determine whether one of a plurality of lines is transmitting or receiving a signal and to effect the impression of the signals from only a tranmitting line on the input of an amplifier. The new circuit, which is a further development of the circuit shown in U.S. Pat. 2,912,503, minimizes signal distortion due to phase shifts and signal attenuations present in the phase-sensitive network of the earlier circuit by employing a novel feedback technique which is used in discriminating between signals incoming from a transmitting line or outgoing to a receiving line. While this interconnecting circiut can be used wherever it is required to discriminate between a transmitted signal and a received signal, for purposes of illustration the operation of this circuit will be described with reference to a telephone conference circuit as a preferred embodiment.

Briefly, according to the invention, a circuit for interconnecting a plurality of telephone lines comprises an amplifier common to the lines for amplifying voice-frequency signals transmitted over the lines, a plurality of line amplifiers and a plurality of substantially unidirectional gates each individual to one of said lines, each amplifier having its input connected to the line termination, and its output connected to the input of one of the gates and the output of the gates being connected in parallel to the input of the common amplifier. The output of the common amplifier, in turn, is connected to the junction of the line termination, and this connection in effect, constitutes a first feedback path, as will be explained hereafter. Another feedback path separate from the first-mentioned feedback path connects the output of the common amplifier to the input of each input amplifier by way of an associated impedance. The signals transmitted to the conference circuit are amplified by the line amplifiers and are passed to the common amplifier through the gates in accordance with whether the signals are being transmitted from a line or received by the line. The above-mentioned feedback paths cause the signal at the input of the line amplifier connected to the line transmitting the voice-frequency signals to be of greater amplitude than, but of the same phase as, the signal at the input of the line amplifiers connected to the lines receiving the voice-frequency signals, so that the gates connected to lines receiving the voice-frequency signals are prevented from passing a signal to the input of the common amplifier.

The above-mentioned first feedback path between the output of the common amplifier and the junction of the telephone lines provides negative feedback to stabilize the gains of the amplifiers and is used to return a portion of the transmitted signal, after amplification by the line amplifier and the common amplifier, to each of the telephone lines. This feedback path together with the emitter-follower output stage of the common amplifier maintains the level of the signal returned to each of the lines substantially unchanged regardless of the number of lines that are, at any time, effectively connected to the circuit for voice-frequency reception.

The circuit has the inherent feature of compensating for the effective impedance drop due to the presence of multiple stations on each of the ports of the conference repeater, so that a plurality of subsets can be connected to each of the ports providing a conference circuit involving, for example, as many as 60 lines and exhibiting minimum signal degeneration or distortion. The conference circuit according to the invention is capable of operating over the wide range of signal levels encountered on any kind of telephone lines including both subscriber lines and trunks of many kinds and may be used, for example, where P.A.B.X. trunks or central office trunks are connected in conference, or in systems where there will be simultaneous connections between, say, an operator's circuit, a subscriber line and a trunk.

DESCRIPTION OF THE DRAWING

The operation of the conference circuit according to the present invention will be better understood with reference to the following detailed description and the accompanying drawing which is a circuit diagram of a preferred embodiment of a conference circuit for interconnecting twelve telephone line circuits.

DETAILED DESCRIPTION

Twelve telephone line circuits can be connected in conference by this conference repeater arrangement. Each of the telephone lines 1–12 is connected to the corresponding terminals such as 101 and 103 of an input transformer 110. Since all the input circuits are similar, only one will be described in detail.

The line isolation transformer 110 is electrically balanced and has a center tap connected to terminal 102 which can be grounded to reduce noise pickup on the lines. The secondary winding of transformer 110 is connected to ground through lead CS and the low impedance output of amplifier 1500 through the primary winding of transformer 1550. Amplifier 1500 is common to each line and is coupled to each line through individual amplifier 100–1200. Lead CS is multiplied to the secondary windings of all the line transformers to provide a junction between the terminals of all the lines.

As was mentioned above, this interconnecting circuit can be used to interconnect both lines and trunks in conference. Lines or trunks having an impedance of either 900 ohms or 600 ohms are matched by a strapping option via terminals such as 105 or 106 of transformer 110. For purposes of illustration, it is assumed that 900 ohm lines are connected to terminals 101, 103 and 201 and 203 of transformers 110, 210 respectively, and that 600 ohm trunks are connected to terminals 1101, 1103 and 1201, 1203 of transformers 1110 and 1210 respectively. Accordingly, the inputs to line amplifiers 100 and 200 are shown connected to terminals 105 and 205 respectively and the inputs to line amplifiers 1100 and 1200 are shown connected to terminals 1106 and 1206 respectively.

A circuit path, including the secondary of line transformer 110, is completed from terminal 105 through resistor 112 and the secondary of transformer 1550 to ground. Terminal 105 is also connected to ground through a varistor 111 which protects transistor 114 and capacitor 113 from high voltage transients.

Line amplifier 100 is of the common-emitter type and comprises transistor 114 having its base connected through capacitor 113 to terminal 105 of the isolation transformer 110. Transistor 114 has its emitter connected through resistor 115 to ground and its collector connected through resistor 117 to negative DC supply. Resistor 116 is connected between the base and collector of the transistor to provide a suitable bias. The collector of amplifier 100 serves as the output and is coupled to the input of common amplifier 1500 through capacitor 118 and gating diodes 120 and 122.

The signal at the output of amplifier 100 is split into positive and negative half cycles by diodes 120 and 122. Diode 122 is connected to be normally conducting during positive half cycles of the signal and diode 120 is connected in parallel with diode 122 to be normally conducting during negative half cycles of the signal. The positive half cycle is passed to lead +SG through diode 122 and the negative half cycle is passed to lead −SG through diode 120. Leads +SG and −SG are multiplied to diodes 220–1200 and 222–1222 respectively at the outputs of all the line amplifiers so that the diode gates are connected in parallel to the input of the common amplifier.

All incoming signals from talking lines enter the common amplifier circuit over leads +SG and −SG. Positive half cycles of current flow from the +SG lead through resistor 1514 and are coupled to the base of transistor 1519 through capacitor 1518. Diodes 1510 and 1511 which are connected in parallel between ground and lead +SG and compensate for the leakage of the gating diodes 120, 220, etc.

Similarly, negative half cycle signals are fed to the inputs of the common amplifier 1500 from lead −SG through resistor 1515 and capacitor 1518 to the base of transistor 1519. Diodes 1512 and 1513 connected in parallel between lead −SG and ground compensate for the leakage of diodes 122, 222, etc. Resistor 1514, resistor 1515 and capacitor 1518 are all connected to point A. Both the positive and the negative half cycles of the signal which had been divided on the +SG and −SG leads are summed at this point and the recombined signal appears across resistor 1516 which is connected between point A and ground. Capacitor 1517 is connected in parallel with resistor 1516 and compensates for phase shifts due to inductive elements and other capacitive elements in the circuit.

Common amplifier 1500 provides three stages of amplification via transistors 1519 and 1532 connected in common-emitter configuration and complementary transistors 1534 and 1538 connected in emitter-follower configuration. Point A is coupled to the base of transistor 1519 through capacitor 1518. Transistor 1519 has its emitter connected to ground through resistor 1521 and its collector connected to a negative supply through resistors 1525 and 1526. Capacitor 1527 is connected between the junction of resistors 1525 and 1526 and ground to decouple the power supply loop from the signal path. Resistor 1520 is connected between the base and the collector of transistor 1519 to provide bias. The collector of transistor 1519 is coupled to the base of transistor 1532 through capacitor 1528.

Transistor 1532 has its emitter grounded and its collector coupled to its base through capacitor 1531 to provide phase equalization to prevent the amplifier from oscillating at high frequencies. The collector of transistor 1532 is also connected directly to the base of transistor 1534 and to the base of transistor 1538 through series diodes 1535 and 1536 which compensate for bias shifts due to any changes in temperature that might occur.

The base of transistor 1538 is connected to the negative supply through resistor 1537. Transistor 1538 has its collector connected to the negative supply and its emitter connected to point C through resistor 1539. Point C is also connected to the emitter of transistor 1534 through resistor 1540. The collector of transistor 1534 is connected to ground. Point C, the output of common amplifier 1500, is coupled to transformer 1550 through capacitor 1541. A feedback path from point C through resistor 1529 to the emitter of transistor 1519 provides AC feedback to stabilize the gain of the common amplifier. Resistor 1530, connected between the base of transistor 1532 and point C, provides negative feedback to transistor 1532 to stabilize the DC operating point of the transistor.

The primary winding of output transformer 1550 is connected between capacitor 1541 and ground lead CS is also connected to the primary winding of transformer 1550 and is multiplied to terminal 4 of each of the line transformers 110–1210.

The secondary winding of transformer 1550 is connected between lead PF and ground. Lead PF is connected to the input of each line amplifier 100–1200 through a resistor, such as 112, and to terminal 105 of the line transformer 110.

In order to describe the operation of the conference circuit, it will be assumed that ports 1, 2 and 12 are loaded by having one or more telephones connected between terminal 101 and 103 of line isolation transformers 110. 210 and 1210 respectively. Port 11 is unloaded. It will also be assumed that the party connected to port 1 is transmitting voice-frequency signals and that the parties connected to ports 2 and 12 are receiving the signals.

To simplify the discussion of the operation of the conference circuit, the contributions to the signal at the input of the line amplifier made by the line transformer, lead CS and lead PF will be discussed as if they were contributed by individual loops whereas the input to the line amplifier actually constitutes a "floating point" having its potential determined by the contributions of the signals carried by the line transformer, lead CS and lead PF.

The signals from a telephone connected to line 1 are coupled from the primary winding to the secondary winding of transformer 110 inducing a voltage between terminals 104 and 105. Current due to the induced voltage flows in the loop comprising lead CS, the low output impedance of the common amplifier through capacitor 1541, resistor 1540, and the emitter-collector path of transistor 1534 to ground. A signal due to the voltage at point C is induced in lead PF through the secondary of transformer 1550 and is returned to amplifier 100 and terminal 105 of the secondary winding of transformer 110 through resistor 112. The current flowing in this feedback loop causes a voltage, which is proportional to, but in phase opposition with the input signal, to appear across resistor 112. The transmitted signal is also passed as a received signal to the secondary windings of line transformers 210–1110–1210, via both leads CS and PF causing a voltage proportional to and in phase with the input signal to be developed across corresponding impedances 212–1212. The operation of the circuits receiving the transmitted signal will be described later.

The signal which is appearing across resistor 112 is applied through capacitor 113 to the base of transistor 114 in the input amplifier 100. Input amplifier 100 inverts the signal so that the output current from the collector of transistor 114 is in phase with the input signal. The amplified signal from the output of the input amplifier flows through capacitor 118 and through diodes 120 and 122. The amplitude of the signal is sufficient to forward bias the diode so that the distortion of the signal caused by the diodes is negligible. The positive half cycles of the signal pass through diode 122 while the negative half cycles of the signal pass through diode 120 to the input of common amplifier via leads +SG and −SG, respectively.

The positive and negative half cycles of the signal are recombined across resistor 1516 at the input to common amplifier 1500. Positive half cycles of current flow through +SG lead through resistor 1514 to 1516 to ground. Negative half cycles of current flow through the −SG lead through resistor 1515 and 1516 to ground. These two half wave currents through resistor 1516 produce a voltage across the resistor which is proportional to the incoming signal. This voltage causes current flow through capacitor 1518 to the base of transistor 1519 at the input of the common amplifier. The signal is inverted and is coupled from the collector of transistor 1519 to the base of transistor 1532 via capacitor 1528. The signal is again inverted and passed directly to the base of transistor 1534 from the collector of transistor 1532. The low impedance emitter-follower output stage of the common amplifier permits the common amplifier to maintain the desired voltage across the secondary of all of the line transformers 110–1210 irrespective of the amount of loading on the transformers through the multiplied CS and PF leads. The output signal passes from the emitters of transistors 1538 and 1534 through resistors 1539 and 1540, respectively, and capacitor 1541 to the primary winding of transformer 1550. The output of the common amplifier is returned through lead CS to terminals 104, 204, 1104, 1204 of the transformers. This signal is in phase with and adds to the signal induced in the secondary of transformer 110.

The signal being sent back over the CS lead to the transformer 110 of the talking station, being in phase with the input signal, causes a reduction in the magnitude of the voltage across resistor 112 and consequently causes a decreases in the output of amplifier 100 causing a subsequent reduction in the output of the common amplifier. The reduced output of the common amplifier when added to the input signal permits a greater voltage drop across resistor 112 causing an increased output from amplifier 100. This negative feedback action over lead CS stabilizes the gain of the line amplifiers.

The signal returned on lead CS from the common amplifier output is returned to terminal 104 of the secondary winding of the transformer for each of the loaded ports, which in this case are ports 1, 2 and 12. Since port 11 is not loaded, its secondary winding appears as an effective open circuit and the winding and the associated line amplifier 1100 have no effect on the operation of the conference circuit.

The signal returned to the listening lines via lead CS causes a voltage to be coupled to the primary winding of the listening transformers 210 and 1210 which provides listening current for the telephones attached to the ports. The signal returned on lead CS develops a voltage drop across resistors 212 and 1212 at the inputs to the line amplifiers 200 and 1200 of the receiving lines. These voltages are in phase with the incoming signal but 180° out of phase with the signal voltage across resistor 112 at the input of line amplifier 100 of the "talking" line. This signal is reduced by a feedback voltage from the common amplifier via lead PF which controls the amplitudes of the signals impressed on the input of the line amplifiers, so that the outputs of the line amplifiers of the receiving stations are prevented from cancelling the output from the talking line amplifier.

The output of the common amplifier is inverted by transformer 1550 and is fed back via lead PF to the input of all the input amplifiers through resistor 112 to amplifier 100. This feedback signal is in phase with the small signal voltage appearing across resistor 112. The input to amplifier 100 is the sum of these voltages.

The feedback signal is also sent to the inputs of the listening line amplifiers via lead PF through resistors such as 212, 1212. However, the signal fed back is out of phase with the voltage, due to the input signal, appearing across the resistors 212 and 1212 at the inputs to amplifiers 200 and 1200, respectively. Consequently, the feedback reference signal subtracts from the signal appearing across these resistances and the input to amplifiers 200 and 1200 is the difference between the signals. Because the feedback signal is greater than the signal derived from the input line, the difference between the signals will result in a signal being impressed on each amplifier input that is in phase with the signal appearing across resistor 112 at the input to the transmitting line amplifier; however, the signal input of the talking line amplifier is greater in amplitude than the signal of the receiving line input amplifiers. It should be noted that the inputs to "receiving" line amplifiers 200 and 1200 are not cancelled, but are merely reduced so that the receiving line amplifiers are prevented from interfering with the signal from amplifier 100.

From the foregoing discussion it should be apparent that the voltage appearing at the junction of the input of amplifier 100 is determined by the contributions at this point of signals from the line and the signals returned through leads CS and PF.

Since the output signal of the amplifier 100 associated with the incoming signal provides a larger voltage than the amplifiers that are associated with the outgoing signals, diodes 220 and 1200, and 222 and 1222 which are interconnected with diodes 120 and 122, are back biased by the signal voltage so that current flow is prevented from the output of the receiving amplifiers to the input of the common amplifier.

All input circuits are identical and any input circuit can become the source of signal to the common amplifier when its associated line is transmitting a signal. A feedback signal to the amplifier will cause the signal appearing at the input of the amplifier transmitting the signal to be greater in amplitude than, but of the same phase as, the signal at the inputs of receiving line amplifiers as long as the receiving line loads do not cause their signals, due to transmitting to be greater than their reference signal. Loading of a receiving line has no effect on the output level to all receiving lines provided the voltage at the amplifier produced by the load is lower in amplitude than the reference signal. Thus, the output signal to all receiving lines is independent of loading to a point where the load impedance reaches a low impedance, sufficient to cause the level of signal produced by the load to exceed the reference signal.

Diodes 1510–1511, and 1512–1513 are used to eliminate sneak paths that would occur due to the multiplying of leads +SG and −SG to the outputs of all of the input amplifiers. For instance, a positive half cycle current flowing through diode 122 through resistor 1514 to point A could traverse the path through resistor 1515 and diode 222 and effect the forward biasing of diode 220 which in turn would permit the passage of the listening signal from amplifier 200. This is prevented by use of diodes 1512, 1513, which will become forward biased upon the application of a positive signal and clamp lead −SG to ground preventing the passage of the positive half cycle signal.

From the foregoing, it will be apparent that applicants' interconnecting circuit requires only a few phase sensitive elements so that phase distortion is effectively eliminated and provides pre-amplification of the signals transmitted by each line before being impressed on the input of the common amplifier so that the amount of distortion caused by the diodes serially connected in the signal path is negligible. Furthermore, the improved circuit in which feedback paths are employed to determine the direction of signal power flow and to maintain constant the level of the signal returned to each line, has the inherent feature of compensating for changes in the effective impedance due to the presence of multiple stations on each of the ports of the conference repeater so that a plurality of subscriber sets can be connected to each port with the result of minimum signal degeneration and distortion.

While the invention has been described with reference to a preferred embodiment in a conference circuit, it should be apparent from the foregoing description that the circuit can be used to provide interconnections in those applications which require two-way transmission of signals between lines interconnected by the circuit and accordingly it is to be understood that the embodiment described is not intended as a limitation to the spirit and scope of the invention as defined by the following claims.

What is claimed is:

1. In a telephone conference circuit:

a plurality of telephone line terminations;

an individual input coupling means connected to each of said line terminations;

an amplifier common to said line terminations for amplifying voice-frequency signals impressed on any one of said coupling means by a respective one of said terminations, said amplifier having its output connected across each of said coupling means;

a plurality of gates, an input of each gate being connected to receive a signal from an individual one of said coupling means, the outputs of all of said gates being connected in parallel to the input of said common amplifier;

separate feedback circuit connections between the output of said common amplifier and each one of said coupling means for causing a signal at the input of the gate coupled to said one of said line terminations from which the voice-frequency signals are impressed on said junction to be of greater amplitude than, but of the same phase as, the signal at the input of the gates coupled to the other terminations, thereby to substantially prevent the last-mentioned gates from passing a signal to the input of the common amplifier.

2. A conference circuit as claimed in claim 1, wherein said feedback circuit connections include impedance means for returning a signal voltage from the output of said common amplifier to the input of each of said gates to control the amplitudes of the signals impressed on the inputs of said gates.

3. A conference circuit as claimed in claim 1, and further including a plurality of line amplifiers each interposed between a respective one of said coupling means and a respective one of said gates for amplifying the voice-frequency signals impressed on said coupling means.

4. A conference circuit as claimed in claim 3, wherein each of said gates includes a first rectifier and a second rectifier connected between a respective line amplifier output and the common amplifier input, and said first and second rectifiers of each of said gates being oppositely poled so each rectifier of each of said gates pass different signals amplified by the respective line amplifier; the outputs of said first rectifiers being interconnected and the outputs of said second rectifiers being interconnected so that the signals from the output of the line amplifier that is coupled to said one termination from which voice-frequency signals are impressed are effective to render nonconductive all of said rectifiers connected to the output of the line amplifiers that are coupled to said other terminations.

5. In a telephone conference circuit:

a plurality of telephone line terminations;

an input coupling means connected to each of said line terminations;

an amplifier common to said line terminations for amplifying voice-frequency signals impressed on any one of said coupling means by a respective one of said terminations, said amplifier having its output connected across each of said coupling means;

a plurality of line amplifiers each having its input connected to an individual one of said coupling means and its output connected to the input of said common amplifier;

gate means interposed in the last mentioned connections between the output of each of said line amplifiers and the input of said common amplifier, said gate means being responsive to the differences in signal amplitudes at the input of the line amplifier coupled to said one termination and the input of the line amplifiers coupled to the other terminations for permitting only the output signal from the first mentioned line amplifier to pass to said input of the common amplifier.

References Cited

UNITED STATES PATENTS 3,399,275 8/1968 Niertit et al.
2,912,503 9/1956 Grandstaff et al.

KATHLEEN H. CLAFFY, Primary Examiner

D. W. OLMS, Assistant Examiner